Dec. 29, 1953 — A. SCHUPP — 2,664,330
PENCIL VENDING MACHINE
Filed April 19, 1950 — 5 Sheets-Sheet 1

INVENTOR.
Alfred Schupp
BY Victor J. Evans & Co.
ATTORNEYS

Dec. 29, 1953 A. SCHUPP 2,664,330
PENCIL VENDING MACHINE
Filed April 19, 1950 5 Sheets-Sheet 2
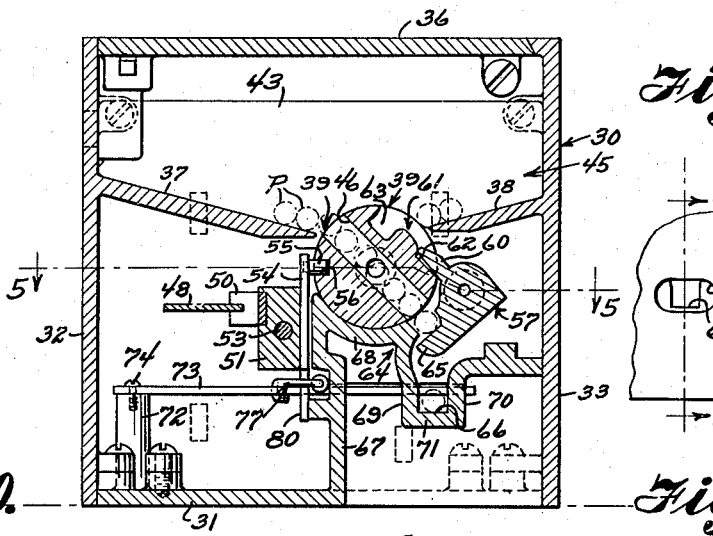
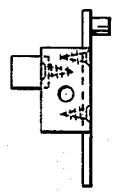
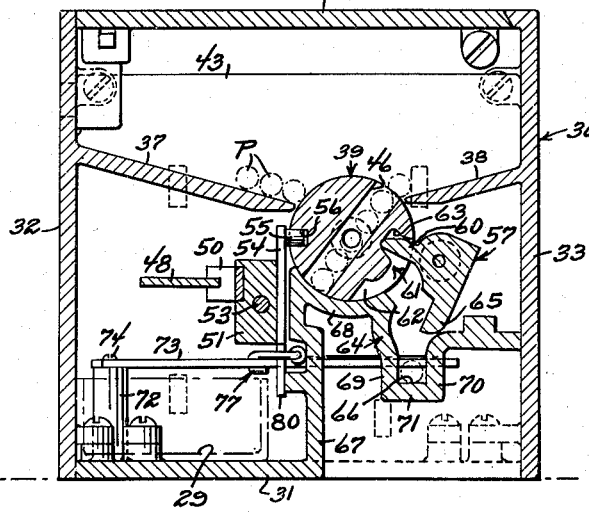
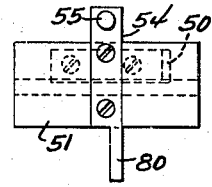
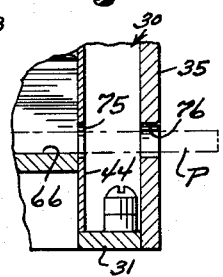
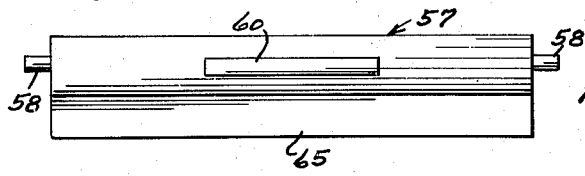
INVENTOR.
Alfred Schupp
BY Victor J. Evans & Co.
ATTORNEYS Dec. 29, 1953   A. SCHUPP   2,664,330
PENCIL VENDING MACHINE
Filed April 19, 1950   5 Sheets-Sheet 3

INVENTOR.
Alfred Schupp
BY Victor J. Evans & Co.
ATTORNEYS

Dec. 29, 1953　　　A. SCHUPP　　　2,664,330
PENCIL VENDING MACHINE
Filed April 19, 1950　　　5 Sheets-Sheet 4

INVENTOR.
Alfred Schupp
BY Victor J. Evans & Co.
ATTORNEYS

Dec. 29, 1953      A. SCHUPP      2,664,330
PENCIL VENDING MACHINE
Filed April 19, 1950      5 Sheets-Sheet 5
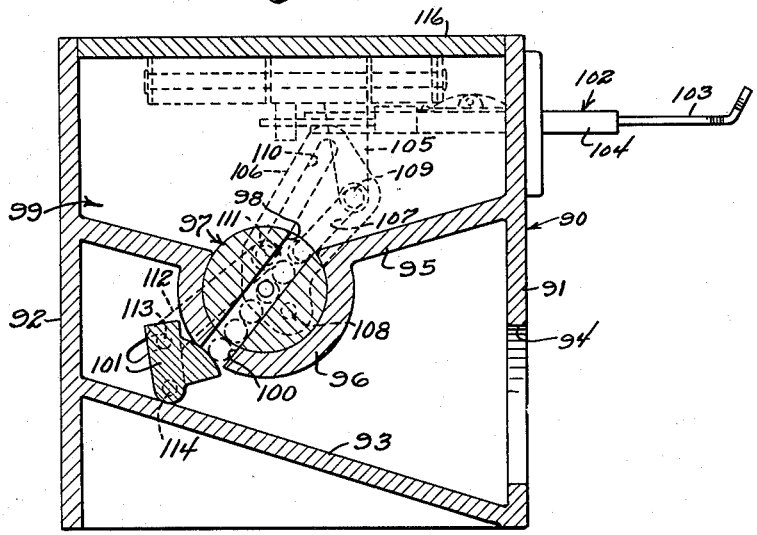
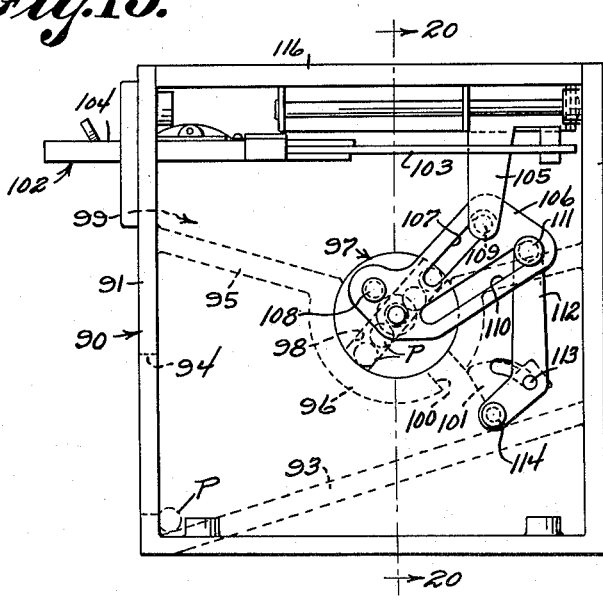
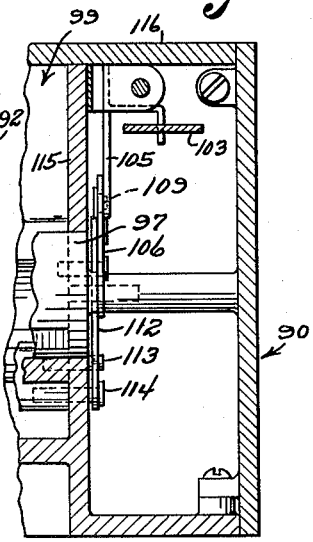
INVENTOR.
Alfred Schupp
BY Victor J. Evans & Co.
ATTORNEYS Patented Dec. 29, 1953

2,664,330

UNITED STATES PATENT OFFICE 2,664,330

PENCIL VENDING MACHINE

Alfred Schupp, San Antonio, Tex.

Application April 19, 1950, Serial No. 156,757

5 Claims. (Cl. 312—75)

1

This invention relates to a dispensing or vending machine, and more particularly to a coin-actuated machine for dispensing articles, such as pencils.

The object of the invention is to provide a dispensing machine which is adapted to contain a quantity of articles, such as pencils, whereupon, by the insertion of a coin into the machine, one of the pencils or articles will be delivered to the purchaser.

Another object of the invention is to provide a dispensing machine which is constructed so as to insure the delivery of a pencil each time a coin is inserted in the machine, the delivery being effected or accomplished by a slotted roller which is caused to rotate upon insertion of a coin in the machine.

Still another object of the invention is to provide a coin-operated, pencil-dispensing machine which will deliver the pencils one at a time to the purchaser, the pencils being delivered through a suitable chute or compartment so as to be readily grasped by the hand.

A further object of the invention is to provide a pencil-vending machine which is extremely simple and inexpensive to manufacture.

Other objects and advantages will be apparent during the course of the following description.

In the accompanying drawings forming a part of this application, and in which like numerals are used to designate like parts throughout the same:

Figure 3 is a sectional view taken on the line 3—3 of Figure 1;

Figure 4 is a view similar to Figure 3, but showing the position of the parts after a coin has been inserted;

Figure 9 is a top plan view of the gate;

Figure 10 is an end elevational view of the pin-carrying block;

Figure 11 is a side elevational view of the pin-carrying block shown in Figure 10;

2

Figure 1:
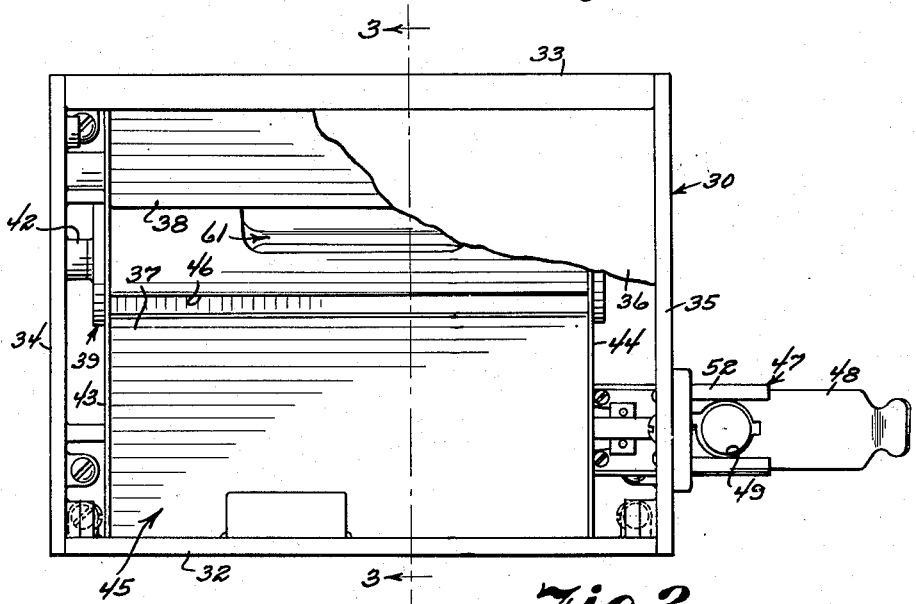
Figure 1 is a top plan view of the dispensing machine of the present invention, with part of the cover broken away.
Figure 2:
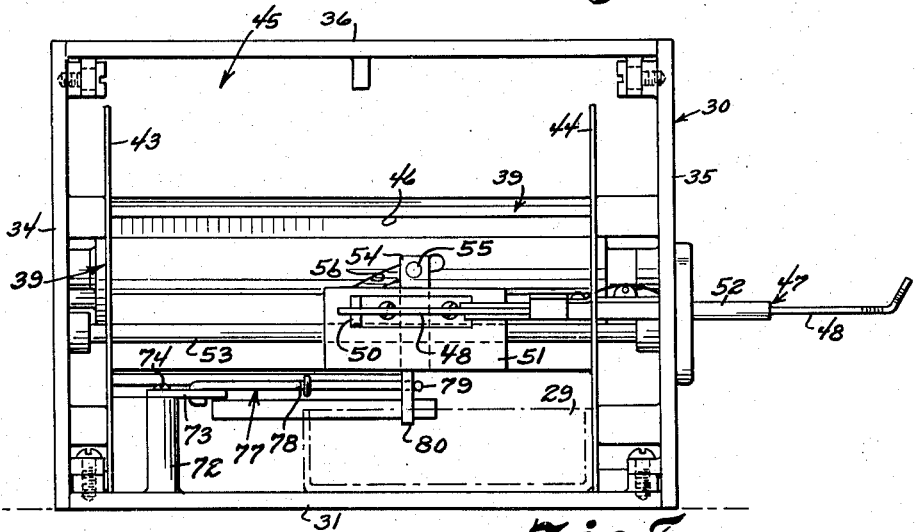
Figure 2 is a side elevational view of the dispensing machine with the side wall removed.
Figure 8:
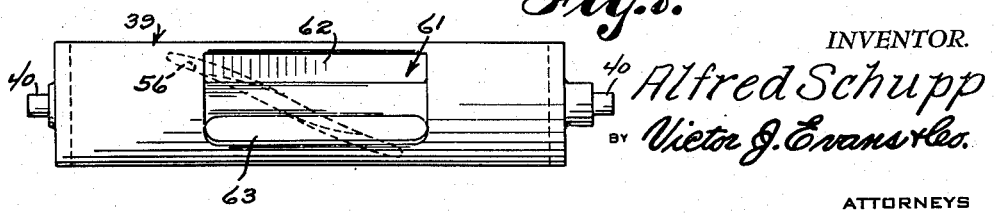
Figure 8 is another view of the roller, showing the side opposite to that illustrated in Figure 7.
Figure 5:
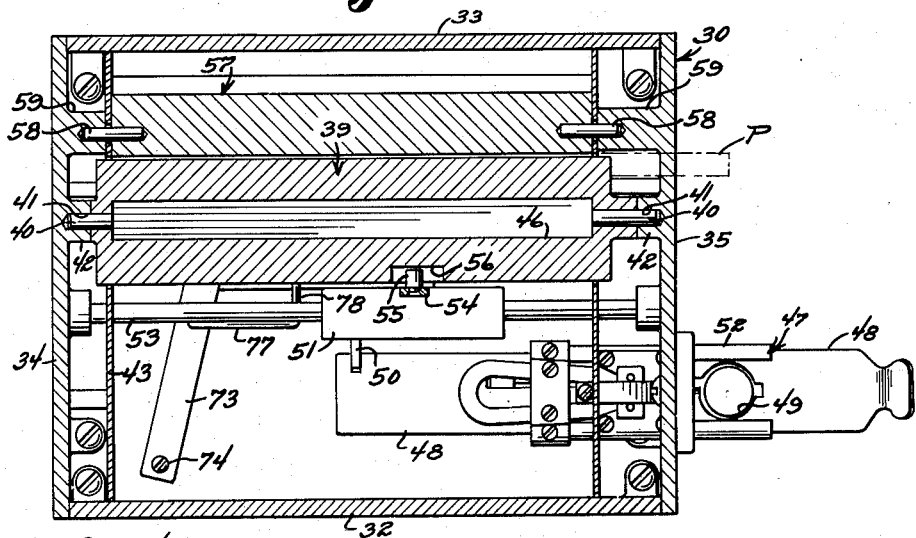
Figure 5 is a sectional view taken on the line 5—5 of Figure 3.
Figure 6:
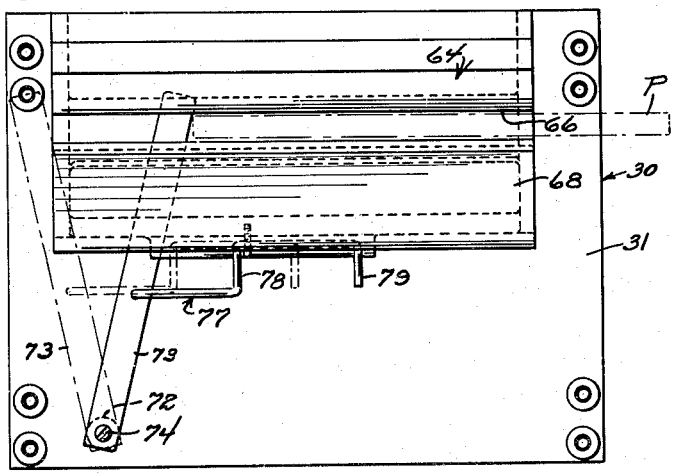
Figure 6 is a plan view showing the construction of the ejector mechanism.
Figure 7:
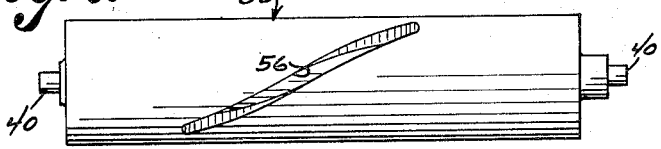
Figure 7 is a plan view of the carrier drum or roller showing the actuating groove.
Figure 14:
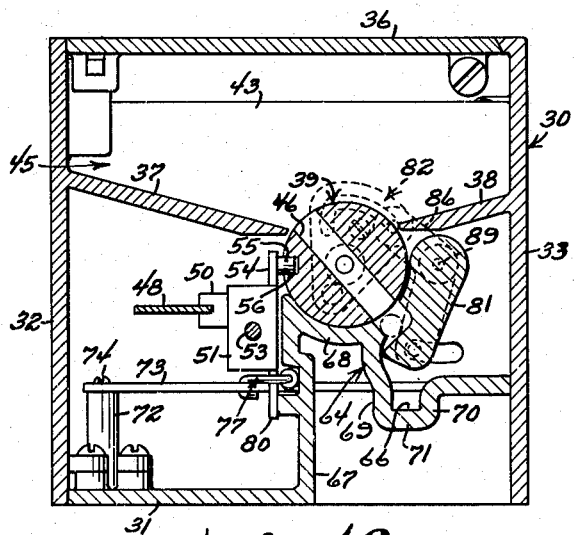
Figure 15:
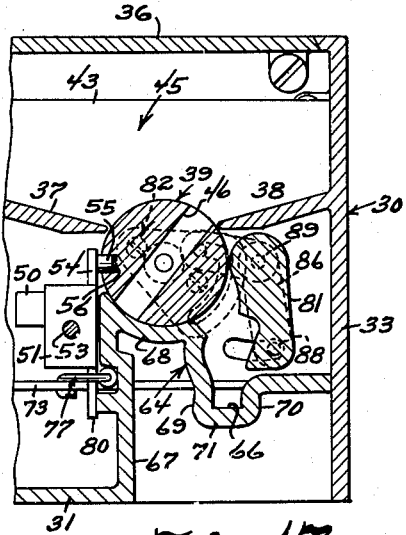
Figure 16:
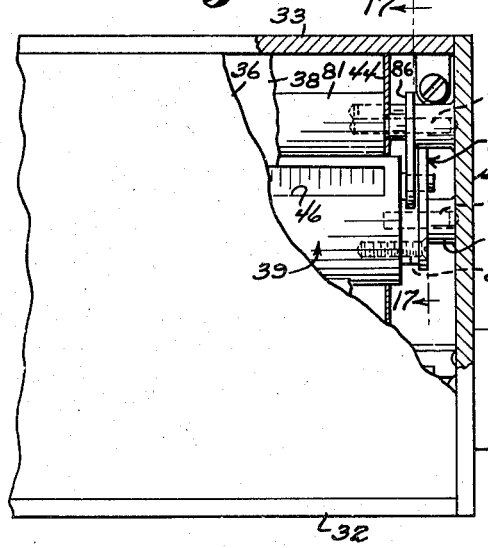
Figure 17:
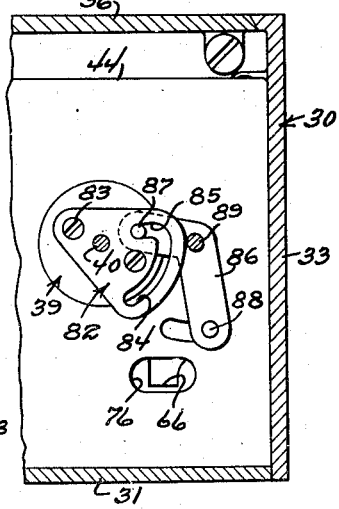

Figure 12 is a fragmentary, front elevational view of the ejector chute;

Figure 13 is a sectional view taken on the line 13—13 of Figure 12;

Figure 14 is a vertical, transverse sectional view of a modified vending machine according to the present invention;

Figure 15 is a fragmentary view similar to Figure 14, but showing the position of the parts after a coin has been inserted;

Figure 16 is a fragmentary top plan view of the machine of Figure 14 with parts broken away and in section;

Figure 17 is a sectional view taken on the line 17—17 of Figure 16;

Figure 18 is a vertical, transverse sectional view of another modified form of the invention;

Figure 19 is a side elevational view of the machine of Figure 18, with the end wall removed and showing the discharge position of the parts after a coin has been inserted;

Figure 20 is a sectional view taken on the line 20—20 of Figure 19.

Referring in detail to Figures 1 through 13 of the drawings, the numeral 30 designates a hollow housing which may be made of any suitable material, the housing 30 including a horizontally disposed bottom wall 31 and a pair of spaced parallel vertically disposed side walls 32 and 33 which are secured to the bottom wall 31 in any suitable manner. Extending between the side walls 32 and 33 and secured thereto is a pair of spaced parallel, vertically disposed end walls 34 and 35, there being a cover or lid 36 detachably connected to the tops of the side and end walls. A suitable lock may be provided for preventing unauthorized persons from removing the cover 36 so as to gain access to the pencils within the housing.

Projecting inwardly from the side wall 32 is an inclined plate 37, there being a second inclined plate 38 projecting inwardly from the other side wall 33. The inner ends of the plates 37 and 38 are spaced from each other, and the upper portion of a carrier drum or roller 39 projects through the space defined between the inner ends of the plates 37 and 38, Figures 3 and 4. The roller or drum 39 extends between the end walls 34 and 35 and is rotatably supported by the latter. For rotatably supporting the roller 39, a pin 40 projects from each end of the roller and into a socket 41 which is formed in a suitable bushing 42 that projects from the corresponding end wall.

Arranged in spaced parallel relation with respect to each other is a pair of vertically disposed end panels 43 and 44, the panels 43 and 44 being interposed between the end walls 34 and 35 of the housing and being secured within the housing. These end panels 43 and 44 coact with the plates 37 and 38 to define a hopper or chamber 45 which is adapted to hold a plurality of the pencils P, or other objects, that are to be dispensed.

Normally, a plurality or quantity of the pencils P are arranged so that they extend lengthwise in the hopper 45 and these pencils are adapted to be dispensed one at a time upon insertion of a coin, such as a nickle, into the vending machine. For delivering or discharging the pencils from the hopper 45, the roller 39 is provided with a longitudinally extending recess 46, and a plurality of the pencils P constantly fill the recess 46.

For causing rotation of the roller 39, a conventional coin-actuating mechanism 47 is provided. The coin-actuating mechanism 47 includes a frame 52 which is secured to the end wall 35 and projects from the housing 30. A coin guide member 48 is slidably arranged in the frame 52, the guide member 48 being provided with a suitable slot 49, Figure 5, for receiving therein a coin. The mechanism 47 is of the type that requires a coin, such as a nickel, to be inserted in the slot 49 before the guide member 48 can be depressed or moved all the way into its actuating position. The inner end of the guide member 48 is connected to a pin-carrying block 51 by a key 50, and the block 51 is slidably mounted on a horizontally disposed, cylindrical rod 53. The rod 53 has its ends supported by the end walls 34 and 35 of the housing. Thus, when a coin is positioned in the slot 49 and the guide member 48 depressed, the pin-carrying block 51 can be reciprocated or moved in the housing.

A lug 54 has its lower end secured to the block 51, and the lug 54 carries a pin 55 on its upper end. The pin 55 is slidably arranged or projects into a groove or channel which is arranged in the exterior of the roller 39. The groove 56 is of such a shape that as the block 51 is reciprocated back and forth by the guide member 48, a rotary motion is imparted to the roller or drum 39, for a purpose to be later described.

Arranged below the plate 38 is a movable gate 57. The gate 57 coacts with the drum 39 and with a body member 64 to insure that only one pencil P is dispensed at a time, as later described in this application. The gate 57 is pivotally connected to bushings 59 that project from the end walls 34 and 35 by pins 58. Further, the gate 57 includes an elongated finger 60 which is adapted to project into a wide, cutaway portion 61 that is arranged in the drum 39. The cutaway portion or cutout 61 includes a relatively shallow section or portion 62 that communicates with a deeper portion 63. The gate 57 also includes an elongated lip 65. Normally, the gate 57 is in the position shown in Figure 3, but when a coin is inserted in the slot 49 and the guide member 48 depressed or actuated, then the roller 39 will be caused to rotate and this will result in the deep portion 63 engaging or receiving the finger 60 of the gate 57 so as to cause a counterclockwise rotation of the gate 57, whereby one of the pencils P can fall into the chamber or compartment 66.

Arranged in the housing 30 is a body member 64 which includes a vertical portion 67 that projects upwardly from the bottom wall 31, and extending from the upper end of the vertical portion 67 is an arcuate portion 68 which is adapted to slidably receive or engage the lower surface of the roller 39. The arcuate section 68 coacts with the lip 65 of the gate 57 to prevent pencils P from accidentally falling out of the recess 46 in the drum 39. Extending downwardly from the free end of the arcuate section 68 is a vertical portion 69 which coacts with a second upstanding vertical portion 70 and with a horizontal portion 71 to define the compartment or chamber 66 for receiving individual pencils P that drop from the recess 46.

An ejector mechanism is provided for forcing or ejecting the pencils P from the compartment 66. This ejector mechanism includes a bushing 72 that projects upwardly from the bottom wall 31, and one end of a horizontally disposed lever 73 is pivotally connected to the upper end of the bushing 72 by a screw or pin 74. The other end of the lever 73 projects into the compartment 66, so that as the lever 73 is caused to swing or pivot in a clockwise direction, the pencil P in the compartment 66 will be forced out through registering openings 75 and 76 in the panel 44 and end wall 35, whereby the pencil P can be grasped by the purchaser, Figure 6. This pivotal movement of the lever 73 is caused by the movement of the carrier block 51. Thus, a rod 77 has its rear end pivotally connected to the lever 73 and the rod 77, which may be made of a piece of wire, is shaped to define a rear shoulder 78 and a front shoulder 79. The lower end of the lug 54 is shaped to define a narrow portion or link 80 which is adapted to engage the shoulder 78 or the shoulder 79 so as to cause pivotal movement of the lever 73. Thus, normally the lever 73 is in the solid line position shown in Figure 6, but when a coin is inserted in the slot 49 and the guide member 48 depressed or actuated, then the lever 73 will be moved to the broken line position of Figure 6. Then, when the guide member 48 is manually withdrawn or returned to its normal position, the lug 80 will engage the front shoulder 79 to move the rod 77 forwardly, whereby the lever 73 will engage or strike the rear end of the pencil P which has been deposited in the compartment 66 to eject the pencil through the registering openings 75 and 76.

To dispense one of the pencils P, a coin is inserted in the slot 49 in the coin-actuating mechanism 47. It is to be noted that a plurality of the pencils P are arranged in the hopper 45. This positioning of the coin in the slot 49 enables the guide member 48 to be depressed manually, so that the pin-carrying block 51 can be reciprocated or slid rearwardly in the housing 30 along the rod 53. This rearward movement of the block 51 imparts a rotary motion to the roller 39, since the pin 55 which is carried by the lug 54 projects into the groove 56 of the roller 39. Initially, the parts are in the position shown in Figure 3, but when the guide member 48 has been depressed, the parts move to the position shown in Figure 4. This movement of these parts is accomplished as follows: As previously described, the drum 39 is caused to rotate and the drum 39 rotates in a clockwise direction, whereby the finger 60 is engaged or received in the deep portion 63 of the cutout 61. This causes a counterclockwise rotation of the gate 57 so that sufficient clearance is provided to enable one pencil P to drop into the compartment 66. The drum or roller 39 has now rotated sufficiently so that the lower end thereof, or the recess 46, is blocked or closed by the arcuate portion 68 so that further pencils are prevented from being deposited or discharged into the compartment 66.

Next, the guide member 48 is withdrawn or retracted manually so that the roller 39 is now rotated in a counterclockwise direction and the gate 57 is rotated or pivoted in a clockwise direction until the parts assume the positions shown in Figure 3. Simultaneously with this retraction of the guide member 48, the lever 73 of the ejector mechanism is caused to pivot in a clockwise direction so that the lever 73 strikes the end of the pencil to force the pencil out of the registering openings 75 and 76, whereby it can be readily grasped by the user's fingers.

Referring in detail to Figures 14 through 17, there is shown a modified form of machine for dispensing pencils one at a time upon insertion of a coin. The construction and operation of the vending apparatus of Figures 14 through 17 is substantially the same as the previously-described machine of Figures 1 through 13, except that now there is provided a gate 81 which has a different construction and actuating means.

Thus, the housing 30 of Figures 14 through 17 includes the side walls 32 and 33, the rotatable drum 39, the inclined plates 37 and 38, and the body member 64, as well as the previously-described ejecting mechanism. For actuating the gate 81, a plate 82 is secured to one end of the roller 39 by suitable securing elements, such as screws 83, Figure 17. The plate 82 has a substantially triangular shape and is provided with an arcuate slot 84 which terminates in a slit 85, the slit 85 being arranged substantially at right angles to the major portion of the slot 84. A cam 86 having a substantial L-shape has a pin 87 mounted on one end, and the pin 87 is adapted to ride or move in the slot 84 or slit 85 upon rotation of the roller 39. A pin 88 connects the other end of the cam 86 to the gate 81, the gate 81 being pivotally connected to the end walls of the housing 30 by a suitable pin 89.

The operation of the machine of Figures 14 through 17 is substantially the same as the operation of the previously-described machine. Thus, the hopper 45 is normally filled with a supply of pencils P to be dispensed, and these pencils also fill the recess 46 in the roller 39. Normally, the parts are in the positions shown in Figure 14, and when a coin, such as a nickel, is inserted in the coin-actuating mechanism 47 and the guide member 48 depressed into the housing, then the block 51 is reciprocated to thereby rotate the drum 39. The drum is rotated in a clockwise direction from the position shown in Figure 14 to the position shown in Figure 15, so that the lowermost pencil that is being retained or held by the coaction of the body member 64 and gate 81 is the only pencil that can fall into the compartment 66. As the drum 39 rotates in a clockwise direction, it carries the plate 82 with it and the pin 87 moves through the slot 84 and seats in the slit 85, so that the cam 86 is caused to pivot in a counterclockwise direction, whereby the gate 81 will move from the position shown in Figure 14 to the position shown in Figure 15, so that the single pencil will fall into the compartment 66. As previously described, the ejector mechanism is used to forcibly push out the pencil from the compartment 66. However, in order to eject the pencil, it is necessary to withdraw or retract the guide member 48, and this withdrawal of the guide member 48 results in the roller 39 and gate 81 returning from the position shown in Figure 15 to the position shown in Figure 14, so that the next pencil moves into position ready to be dispensed upon insertion of a coin into the machine.

Referring to Figures 18 through 20 of the drawings, there is shown another modified form of the vending or dispensing machine. In this form of the invention, there is no ejector mechanism, but instead the pencils fall by gravity into a chamber which is readily accessible to the purchaser. Also, the modification shown in Figures 18 through 20 has a different drum-actuating and gate-actuating means. The vending machine of Figures 18 through 20 includes a hollow housing 90 that includes a vertically disposed front wall 91 and a vertically disposed, spaced parallel rear wall 92, there being an inclined partition 93 extending between the front and rear walls for guiding pencils toward the front of the housing. The front wall 91 is provided with a relatively large opening 94 so that the purchaser can readily and easily reach into the housing and pick up the pencil that has been dispensed or delivered to him.

Extending between the front and rear walls of the housing 90 is a support member 95 which includes an intermediate arcuate portion 96 that rotatably receives therein a roller or drum 97. The roller 97 is rotatably mounted in the housing, and the roller 97 includes an elongated or longitudinally extending recess 98 which is adapted to be filled with pencils P that pass into the recess from the hopper 99. The hopper 99 is defined by the upper surface of the support member 95 as well as the coacting end and side walls of the housing 90. The intermediate portion 96 of the support member 95 is provided with a slot 100, and upon rotation of the roller 97, the recess 98 therein will move into and out of registry with the slot 100. A gate 101 serves to normally close the slot 100 so that pencils are prevented from accidentally falling onto the partition 93. A means is provided for moving the gate 101 from the position shown in Figure 18 to the position shown in Figure 19, so as to allow a single pencil to be dispensed upon insertion of a coin in the coin-actuating mechanism 102.

The coin-actuating mechanism 102 is conventional and includes a manually operable guide member 103 that is slidably arranged in a frame 104, the frame 104 being secured to the front wall 91 of the housing 90. Mounted within the housing 90 and connected to the inner end of the guide member 103 is a bracket 105, so that as the guide member 103 is reciprocated back and forth, the bracket 105 also moves back and forth. A plate 106 is secured to an end of the roller 97 by suitable securing elements, such as screws or rivets 108, and the plate 106 is provided with a first slot 107. A pin 109 is mounted on the lower end of the bracket 105, the pin 109 riding in the slot 107. Thus, reciprocation of the bracket 105 causes a rotation of the plate 106 and also a rotation of the roller 97.

The plate 106 is further provided with a second slot 110, and a pin 111 is adapted to move or slide in the slot 110. The pin 111 is carried by an end of a substantially L-shaped cam 112. A pin 113 connects the cam 112 to the gate 101, the gate 101 being pivotally connected to a panel 115 by a pin 114, and the gate 101 is also pivotally connected to a distant side wall of the housing.

In using the pencil vending machine of Figures 18 through 20, a suitable supply of pencils is placed in the hopper 99. The housing 90 may be provided with a cover 116 which is detachably connected to the housing so that the supply of pencils can be replenished from time to time. These pencils in the hopper 99 fill the recess 98 in the roller 97, but the pencils are normally prevented from being dispensed by the curved surface on the gate 101 which serves to normally block the slot 100 in the intermediate portion 96 of the support member 95. However, when a coin is inserted in the actuating mechanism 102, the guide member 103 can be depressed or moved manually into the housing 90, whereby the roller 97 will be rotated in a counterclockwise direction, Figure 18, and also the gate 101 will move out of the way to permit one pencil to drop onto the partition 93 and after the pencil comes to rest it can be picked up through the opening 94 by the purchaser. This rotation of the roller 97 and gate 101 is accomplished as follows: Inward movement of the guide member 103 causes the bracket 105 to move away from the front wall 91 and toward the rear wall 92. Since the pin 109 is projecting through the slot 107 in the plate 106, this movement of the bracket 105 will cause a counterclockwise rotation of the plate 106, Figure 18, so that the roller 97 will also be rotated in a counterclockwise direction to prevent more than one pencil from being dispensed at a time. At the same time, this movement of the plate 106 causes a counterclockwise movement of the cam 112, since the pin 111 connects the cam 112 to the plate 106. Then, this movement of the cam 112 results in the gate 101 being moved to the position shown in Figure 19, so that the single pencil which was positioned in the slot 100 in the intermediate portion 96 will be able to fall onto the partition 93 and then this pencil will be guided downwardly toward the front of the machine.

From the foregoing, it is apparent that a pencil vending machine has been provided which will dispense only one pencil at a time, and this pencil will only be dispensed by insertion of a coin in the coin-actuating mechanism. Also, the machine is so constructed that it will not be likely to get out of working order and the machine is adapted to be used for dispensing other articles besides pencils. Further, it is to be noted that as the roller is rotated back and forth, the pencils thereabove in the hopper will be constantly shuffled or moved about so as to tend to prevent the pencils from becoming clogged. A coin box 29 is adapted to receive coins from the coin actuating mechanism.

I claim:

1. In a coin-controlled pencil vending machine, a hollow housing including spaced parallel vertically disposed end walls, spaced parallel vertically disposed side walls extending between said end walls, and a horizontally disposed bottom wall, a pair of spaced parallel vertically disposed end panels projecting upwardly from said bottom wall and interposed between said end walls, a pair of inclined plates extending inwardly from said side walls and coacting with said end panels to define a hopper for holding pencils, the inner ends of said plates being spaced from each other, a horizontally disposed roller extending between said end walls and rotatably supported thereby, a portion of said roller projecting through the space defined between said pair of plates, there being a longitudinally extending recess extending through said roller for communication with said hopper, said roller having a portion of its exterior cut away to define a shallow portion and a deep portion, a gate extending between said end walls and rotatably supported thereby, said gate including an elongated finger operatively connected with the shallow and deep portions in said roller, a body member arranged in said housing and including a vertically disposed portion projecting upwardly from said bottom wall, an arcuate top portion projecting from said vertically disposed portion for slidably engaging said roller, said body member being shaped to define a compartment for receiving pencils that pass from said hopper through the recess in said roller, past said gate, and coin controlled means for rotating said roller to deliver pencils into said compartment, said gate including an elongated lip mounted for movement into and out of bridging relation with respect to the recess in said roller, the arcuate top portion of said body member closing said recess when the roller has been rotated by the coin controlled means, said lip closing said recess in normal position before operation of said coin controlled means.

2. The apparatus as described in claim 1, wherein said coin-controlled means embodies a block slidably arranged in said housing, a pin carried by said block, a coin-operated member for causing movement of said block, there being a groove arranged in the exterior of said roller for receiving said pin whereby sliding movement of said block by said coin-operated member causes rotation of said roller.

3. In a coin-controlled pencil vending machine, a hollow housing including spaced parallel vertically disposed end walls, spaced parallel vertically disposed side walls extending between said end walls, and a horizontally disposed bottom wall, a pair of spaced parallel vertically disposed end panels projecting upwardly from said bottom wall and interposed between said end walls, a pair of inclined plates extending inwardly from said side walls and coacting with said end panels to define a hopper for holding pencils, the inner ends of said plates being spaced from each other, a horizontally disposed roller extending between said end walls and rotatably supported thereby, a portion of said roller projecting through the space defined between said pair of plates, there being a longitudinally extending recess extending through said roller for communication with said hopper, said roller having a portion of its exterior cut away to define a shallow portion and a deep portion, a gate extending between said end walls and rotatably supported thereby, said gate including an elongated finger operatively connected with the shallow and deep portions in said roller, a body member arranged in said housing and including a vertically disposed portion projecting upwardly from said bottom wall, an arcuate top portion projecting from said vertically disposed portion for slidably engaging said roller, said body member being shaped to define a compartment for receiving pencils that pass from said hopper through the recess in said roller, past said gate, coin controlled means for rotating said roller to deliver pencils one at a time into said compartment, said gate including an elongated lip mounted for movement into and out of bridging relation with respect to the recess in said roller, the arcuate top portion of said body member closing said recess when the roller has been rotated by the coin controlled means, said lip closing said recess in normal position before operation of said coin controlled means, ejecting means for forcing said pencils out of said compartment, said coin-controlled means embodying a block slidably arranged in said housing, a pin carried by said block, a coin-operated member for causing movement of said block, there being a groove arranged in said roller for receiving said pin whereby sliding movement of said block by said coin-operated member causes rotation of said roller, said ejector means comprising a vertically disposed bushing projecting upwardly from said bottom wall, a horizontally disposed lever having one end pivotally connected to said bushing and having its other end projecting into said compartment for engagement with a pencil therein, there being registering openings in one of said panels and end walls for the discharge therethrough of a pencil, and means connecting said carrier block to said lever.

4. The apparatus as described in claim 3, wherein said last-named means comprises a horizontally disposed rod having one end pivotally connected to said lever, and a vertically disposed link carried by said block for engagement with said rod.

5. In a coin controlled pencil vending machine, a hollow housing including spaced parallel vertically disposed end walls, spaced parallel vertically disposed side walls extending between said end walls, and a horizontally disposed bottom wall, a pair of spaced parallel vertically disposed end panels projecting upwardly from said bottom wall and interposed between said end walls, a pair of inclined plates extending inwardly from said side walls and coating with said end panels to define a hopper for holding pencils, the inner ends of said plates being spaced from each other, a horizontally disposed roller extending between said end walls and rotatably supported thereby, a portion of said roller projecting through the space defined between said pair of plates, there being a longitudinally extending recess extending through said roller and communicating with said hopper, a gate extending between said end walls and rotatably supported thereby, means operatively connected with the roller for operating the gate, a body member arranged in said housing and including a vertically disposed portion projecting upwardly from said bottom wall, an arcuate top portion projecting from said vertically disposed portion for slidably engaging said roller, said body member being shaped to define a compartment for receiving pencils that pass from said hopper through the recess in said roller, and coin controlled means for rotating said roller to deliver pencils one at a time into said compartment, said gate including an elongated lip mounted for movement into and out of bridging relation with respect to the recess in said roller, the arcuate top portion of said body member closing said recess when the roller has been rotated by the coin controlled means, said lip closing said recess in normal position before operation of said coin controlled means.

ALFRED SCHUPP.

References Cited in the file of this patent

UNITED STATES PATENTS

| Number | Name | Date |
|---|---|---|
| 310,942 | Hickie | Jan. 20, 1885 |
| 371,146 | Lynde | Oct. 4, 1887 |
| 510,778 | Ellison et al. | Dec. 12, 1893 |
| 788,331 | Rivkin | Apr. 25, 1905 |
| 886,823 | Lammer | May 5, 1908 |
| 1,058,317 | McGill | Apr. 8, 1913 |
| 1,462,283 | Hegnes | July 17, 1923 |
| 1,639,295 | Jesnig | Aug. 16, 1927 |
| 1,657,694 | Parker | Jan. 31, 1928 |
| 2,497,371 | Poister | Feb. 14, 1950 |

FOREIGN PATENTS

| Number | Country | Date |
|---|---|---|
| 13,693 | Great Britain | 1885 |